United States Patent [19]
Ellis et al.

[11] 3,819,166
[45] June 25, 1974

[54] GAS BLADDER FOR COMBINATION LIQUID GAS SUSPENSION DEVICE

[75] Inventors: George S. Ellis, Madison, Wis.; John Robertson, Royal Oak; Ming-Chin Yew, Sterling Heights, both of Mich.

[73] Assignee: General Motors Corporation, Detroit, Mich.

[22] Filed: Oct. 12, 1972

[21] Appl. No.: 296,762

[52] U.S. Cl............................................. 267/64 R
[51] Int. Cl................................................. F16f 5/00
[58] Field of Search.... 267/64 R, 64 A, 65 R, 65 A, 267/65 B

[56] References Cited
UNITED STATES PATENTS
3,173,671  3/1965  Broadwell................... 267/64 R
3,385,590  5/1968  Auner............................ 267/65 R Primary Examiner—James B. Marbert
Attorney, Agent, or Firm—J. C. Evans

[57] ABSTRACT

A combination gas and liquid suspension device having an inner pressure cylinder surrounded by an outer cylinder to form a liquid filled reservoir space therebetween. An open end of the outer cylinder is closed by a member on which is supported a U-shaped bladder to form a sealed gas chamber depending from the open end of the outer cylinder into the liquid filled reservoir space. The bladder is charged through a passageway formed in the member and is sealed integrally therewith. Means are provided to vary the amount of liquid within the reservoir and inner cylinder to vary the gas pressure within the gas space to produce changes in the resultant force on a piston rod to control the height relationship between the sprung and unsprung mass of the vehicle.

4 Claims, 3 Drawing Figures

PATENTED JUN 25 1974 3,819,166

GAS BLADDER FOR COMBINATION LIQUID GAS SUSPENSION DEVICE

This invention relates to vehicle suspension devices, and more particularly to combination gas and liquid suspension devices of the type including inner and outer liquid filled cylinders in communication with a reservoir space having a sealed gas chamber forming bladder therein to vary the pressure within the unit in accordance with the volume of liquid occupying the liquid filled inner cylinder and reservoir space of the device thereby to produce a resultant force on a piston rod component extending from the inner cylinder to maintain predetermined height relationships between the sprung and unsprung masses of the vehicle.

In combination liquid and gas vehicle suspension devices a bladder component is located within a liquid filled space to vary the pressure within the device so as to produce a resultant force on an extendable member to produce a change in the height relationship between the sprung and unsprung mass of the vehicle to maintain a desired height relationship therebetween.

In such devices the purpose of the bladder component is to separate two fluids within the unit. In most devices of this type the bladder component has segments thereon sealed to relatively movable portions of the device in order to allow for relative movement between opposite end portions of the device during a vehicle leveling operation.

In other types of suspension devices the bladder components are maintained in a stationary relationship within the suspension device. In either case, however, it is necessary to carefully seal segments of the bladder to prevent the escape of a gas charge into the liquid side of the device.

Accordingly, an object of the present invention is to provide an improved combination liquid and a gas suspension device wherein a gas space forming bladder is free to float within a liquid reservoir portion of the device and wherein it is sealed with respect to the liquid reservoir on a single member which also serves to close the open end of an outer cylinder portion of the device.

A further object of the present invention is to improve a combination liquid and gas suspension device having a floating bladder therein surrounded by fluid by the provision of improved seal structure between the bladder and end closure member to allow the bladder to depend freely within a liquid filled reservoir to take a natural shape upon changes in pressure conditions within the device and to have surrounding liquid in direct contact with the outer wall of the suspension device to promote cooling of gas within the bladder.

Still another object of the present invention is to provide a combination gas and liquid suspension device having an outer reservoir forming cylinder and an inner pressure cylinder both filled with liquid and wherein damping components are located within the inner cylinder including a piston rod extending therefrom; the piston rod being supported by an end closure member for the outer cylinder; the closure member having spaced axial seal surfaces thereon in supporting sealing engagement with the distal end portions of inner and outer walls of a bladder having a U-bend joining the inner and outer walls to form a unitary sealed gas space within the liquid filled cylinder located in and removable from the outer cylinder as a unit with the end closure.

Still another object of the present invention is to improve a gas chamber forming assembly for use in a combination gas and liquid suspension device by the provision of a closure member for an outer reservoir cylinder, the member having an axial extension thereon with axially spaced sealing surfaces, one of which is formed radially outwardly of the other to support the distal ends of inner and outer wall portions of a U-shaped bladder; the distal ends of the wall portions being held in sealing engagement with the axial spaced sealing surfaces to seal the U-shaped bladder to the closure member to form a sealed gas chamber therebetween and wherein means are formed in the closure member to direct gas interiorly of the bladder to cause inner and outer wall portions thereof to move apart and wherein the inner and outer wall portions are free to move together when a greater volume of liquid is directed into the suspension device thereby to increase the pressure within the sealed gas chamber to produce an increase in the resultant force of a member which extends from the device to maintain a desired height relationship between the sprung and unsprung mass portion of a vehicle.

Further objects and advantages of the present invention will be apparent from the following description, reference being had to the accompanying drawings wherein a preferred embodiment of the present invention is clearly shown.

Figure 1:
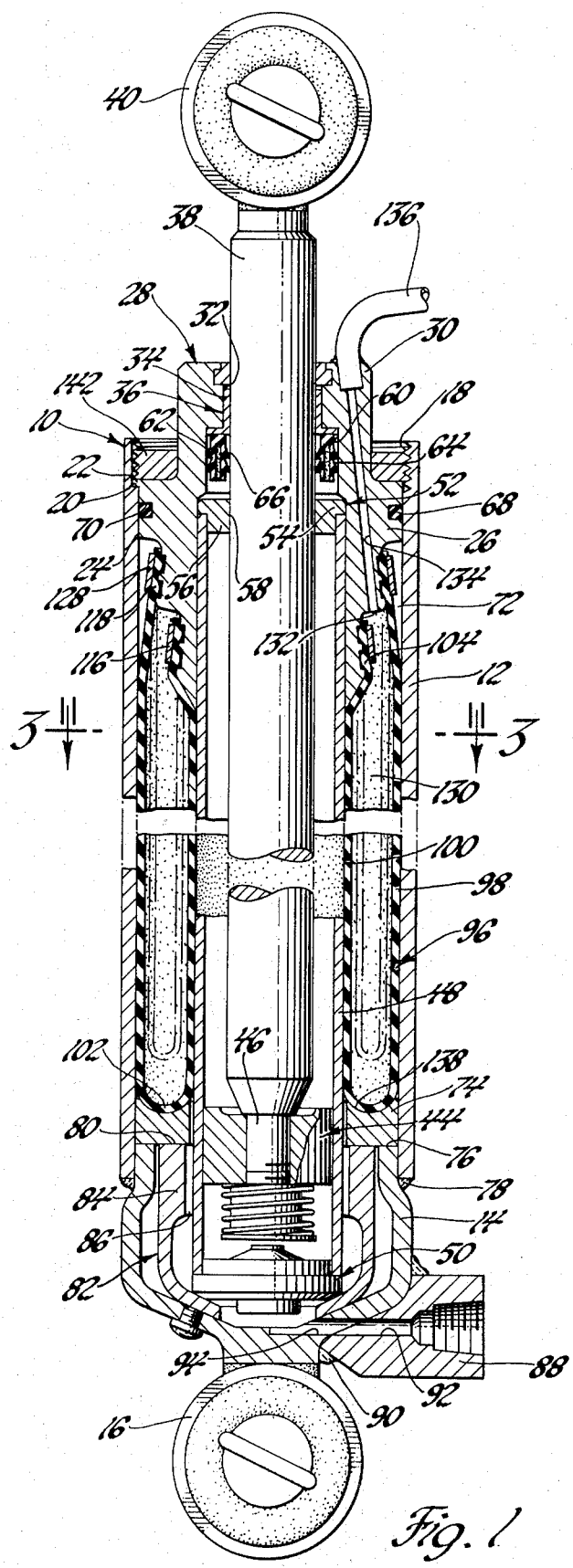
FIG. 1 is a view in vertical section of a combination liquid and gas suspension device constructed in accordance with the present invention.

Referring now to the drawing, FIG. 1 shows a combination gas and liquid suspension device 10 having an outer cylinder 12 open at its upper end and closed at the lower end by a cap member 14. The cap member 14 is connected to a ring mount 16 adapted to be connected to a sprung or unsprung mass portion of a vehicle.

The open end of the outer cylinder 12 is internally threaded at 18 and has an internal shoulder 20 that supportingly receives an indexing flange 22 formed on the outer periphery 24 of a hub portion 26 on a combination end closure and rod guide member 28. The member 28 includes an outer end 30 thereon with an opening 32 formed centrally thereof in which is fit an axial portion 34 of an L-shaped rod guide bearing member 36.

The axial portion 34 of the bearing 36 supportingly receives the outer periphery of a piston rod 38 at the point it extends from the device 10. The rod 38 has a ring mount 40 connected on the end thereof that is adapted to be connected to the other of the vehicle mass portions whereby relative movement between the sprung and unsprung masses of the vehicle will cause the ring mounts 16 and 40 to move with respect to one another.

In the illustrated arrangement piston rod 38 forms part of a damper assembly 42 for controlling the relative movement between the unsprung and sprung mass of the vehicle. The damper assembly 42 more particularly includes a valved piston assembly 44 connected on a small diameter extension 46 on the opposite end of the piston rod 38 within a pressure cylinder 48.

Pressure cylinder 48 is filled with a suitable damping liquid and the outer periphery of the valved piston 44 is located in sliding sealing engagement with the inner surface of cylinder 48 for opposite reciprocation with respect thereto upon relative movement between the sprung and unsprung masses of the vehicle.

In the illustrated arrangement pressure cylinder 48 has a lower end thereof closed by a base valve assembly 50 with valving to control liquid flow to and from cylinder 48 and a liquid reservoir. The opposite end of the pressure cylinder 48 is closed by a rod guide member 52 having an integral flange 54 thereon supported against the upper edge of the pressure cylinder 48 and including an axial segment 56 extending into the upper end of the pressure cylinder 48. Segment 56 includes an opening 58 therethrough through which the piston rod 38 is directed to form a bearing surface to support the rod 38 at a point axially spaced from the rod supporting surface of the bearing member 36.

The member 28 has a bore 60 therein located between the bearing member 36 and the rod guide member 52. It includes an annular seal 62 therein having a plurality of outer peripheral lips 64 thereon in engagement with the bore surface 60 and a plurality of peripherally inwardly located lips 66 formed circumferentially around the outer surface of the rod 38 to seal against leakage therealong.

In accordance with certain principles of the present invention, the member 28, in addition to providing a sealed cavity and a rod bearing point, also has an annular O-ring seal 68 formed in a groove 70 in the hub 26 thereof. The seal 68 engages the inner surface of the outer cylinder 12 below the shoulder 20 thereon to seal the upper end of an annular elongated liquid filled reservoir space 72 formed between the inner surface of the outer cylinder 12 and the outer periphery of the pressure cylinder 48.

A ring member 74 is supported at one end of the reservoir space 72 on an inwardly located edge 76 of the end cap 14 which is inside of the outer reservoir cylinder 12. The cap 14 is connected to cylinder 12 by means of a circumferential weld 78 to seal the reservoir space at the juncture between the cap 14 and the cylinder 12.

The ring member 74 is also supported on an inner edge 80 of a holder member 82 having a cylindrical portion 84 thereon located in spaced coaxial relationship to the inner surface of the end cap 14. The portion 84 is spaced with respect to the end of the pressure cylinder 48 to form a flow passageway 86 communicating the reservoir with the base valve assembly 50.

The base valve assembly 50 includes valving components to permit return flow from the liquid flow reservoir through the interior of the pressure cylinder 48 to fill the pressure cylinder 48 with liquid as the piston rod moves externally thereof during a rebound movement between the sprung and unsprung mass of the vehicle. Likewise, it includes valving components to permit liquid to be displaced from the interior of the pressure cylinder 48 into the liquid filled reservoir space 72 during a compression stroke between the sprung and unsprung mass which causes the piston rod 38 to move interiorly of the liquid filled cylinder 48. During both the compression and rebound strokes suitable valving components are present in the valve piston 44 to produce a damping action against relative movement between the sprung and unsprung masses during both the rebound and compression stroke.

Another feature of the device 10 is the provision of a liquid fill fitting 88 which is connected by means of a weld 90 on one side of the end cap 14. The fitting 88 includes a passageway 92 therethrough which is in communication with a port 94 formed in the end cap 14 at a point below the base valve assembly 50. This port 94 serves as a fill and exhaust port for liquid flow into the interior of the device 10.

Figure 3:
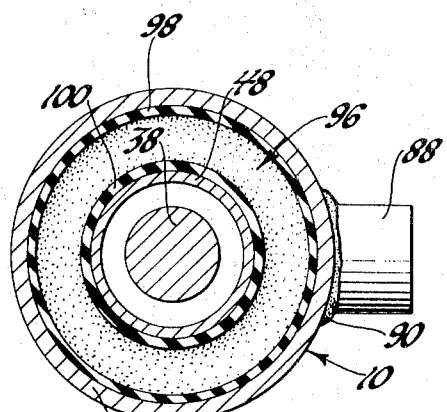
FIG. 3 is a cross-sectional view taken along line 3—3 in FIG. 1 looking in the direction of the arrows.

In accordance with certain principles of the present invention, the gas side of the combination gas and liquid suspension device 10 is formed as an integral part of the combination rod guide and end closure member 28. More particularly, the gas side of the device is formed by a U-shaped flexible bladder member 96 which has an outer wall portion 98 thereon spaced with respect to an inner wall portion 100. As best seen in FIG. 3, each of the wall portions 98, 100 have a circumferential form. They are joined together at one end by means of a U-bend end portion 102.

Figure 2:
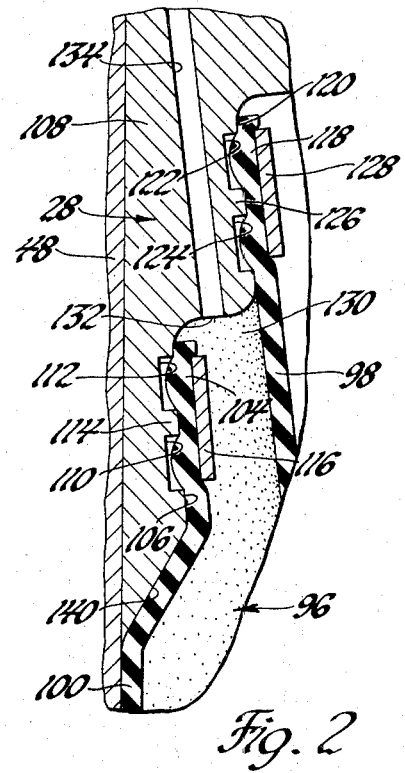
FIG. 2 is an enlarged fragmentary cross-sectional view of seal surfaces on an end closure member of the assembly in FIG. 1.

The opposite end of the inner wall member has a continuously formed circumferentially distal end 104 which is located against a radially inwardly located and axially extended seal surface 106 on a tubular extension 108 formed integrally with the hub 26 of the member 28. As best illustrated in FIG. 2, the seal surface 106 includes peripheral grooves 110, 112 therein separated by means of a peripheral ridge portion 114. The peripheral pressure ridge portion and grooves confine the inner surface of the circumferential distal end 104 of the flexible inner wall member 100 against axial movement with respect to the member 28. It is secured in place by means of a pressure band 116. Preferably the pressure band 116 is a ring of aluminum material which is formed by suitable means such as a magnetically applied force to be reduced from a first diameter to a lesser diameter which serves to firmly clamp the distal end 104 between the ring 116 and the seal surface 106.

The outer wall 98 also has a continuously circumferentially formed distal end 118 thereon. It is supported on a seal surface 120 formed on the tubular extension 108 radially outward of the sealing surface 104 and axially between the surface 106 and the hub 26 of the member 28. The seal surface 120 includes a pair of parallel spaced apart grooves 122, 124 therein separated by a pressure ridge 126. The grooves and pressure ridge confine the inner surface of the distal end 118 against axial movement with respect to the seal surface 120. As was the case with the distal end 104 a pressure band 128 like the pressure band 116 is located continuously circumferentially around the distal end 118 for securing it in its confined relationship with respect to the outer surface configuration of the seal surface 120.

By virtue of the aforedescribed interconnection between the U-shaped bladder 96 and the member 28 a sealed gas chamber 130 is formed integrally with the member 28 to be moved therewith with respect to the liquid filled reservoir space 72.

In the illustrated arrangement, the sealed gas space 130 is communicated with an outlet 132 formed in the extension 108 between the seal surfaces 106, 120 thereon. The outlet 132 leads to an elongated passageway 134 through the member 28 inclined with respect to the axis of the rod 38. The passageway 134 is adapted to be connected to suitable charging means such as a conduit 136 for directing a predetermined amount of gas into the sealed chamber 130 to maintain a gas charged condition therein. Following charging the passageway is sealed by suitable means to trap the gas within the space 130.

Dependent upon the amount of liquid volume within the interior of the device 10, the U-shaped flexible bladder 96 will have expanded and contracted positions. As shown in solid lines in FIG. 1, the expanded position of a bladder 96 has the outer wall 98 and inner wall 100 thereof located respectively against the outer cylinder 12 and the outer periphery of the pressure cylinder 48. Also, the U-bend end 102 will be supported within a shallow circumferential trough 138 formed in the ring member 74. The extension 108 has a circumferential taper 140 formed on the inner end thereof to form a smooth transition to support the inner wall 100 in its expanded state adjacent the location of the seal surface 106.

By virtue of the aforedescribed configuration, the U-shaped bladder 96, when expanded, is fully supported throughout its surface extent thereby to prevent segments of the surface of the bladder 96 becoming folded on itself or puckered in a fashion to cause excessive frictional wear between adjacent surface segments thereon.

The contracted position of the U-shaped bladder 96 is illustrated in dotted lines in FIG. 1. The contracted position of the bladder 96 occurs when a predetermined amount of oil volume is directed through the fitting 88 into the interior of the oil filled device 10. Under these conditions the additional amount of liquid in the interior will eventually flow into the reservoir 72. Because of the supported configuration of a bladder when in its extended position, the oil will flow uniformly along the outer surface of the bladder to uniformly compress the gas therein so as to cause the U-shaped bladder to assume a free-floating relationship with the outer surface of the pressure cylinder 48 and the inner surface of the outer cylinder 12. The bladder 96 thereby floats freely within the reservoir and is surrounded by the fluid therein. The free floating disposition of a bladder as it depends from the extension 108 allows it to assume a natural shape during any pressure conditions to a fully expanded condition as shown in solid lines where it is supported as mentioned above.

Another feature is that the bladder relationship to the outermost cylinder 12 of the device 10 promotes cooling in the device. The liquid in the reservoir space 72 will cool the gas within the charged chamber 130 and heat will be dissipated from the liquid in the reservoir by direct heat transfer contact with the inner surface of the outermost wall 12.

At the beginning of the assembly the pressure band 116 is slipped over the inner wall 100 and the sealing surface. A magnetic pulse is directed through the band to decrease the diameter of the metal band to squeeze the distal end in place as mentioned above. Then the bladder is rolled over to assume its U-shaped configuration and the same operation is performed on the distal end 118. Since the U-shaped bladder is formed on closely adjacent sealing surfaces on a common member both the U-shaped bladder 96 and member 128 are easily assembled by mass production methods merely by locating them as a unit into the open upper end of the outer cylinder 12. The flange 22 will locate the U-shaped bladder in the proper relationship axially within the reservoir space 72. When so located, a lock nut 142 is threadably secured in the open end of the cylinder 12 to fasten the member 28 in place therein as illustrated in FIG. 1.

The unitary seal chamber formed by the member 28 and U-shaped bladder are then easily charged externally of the unit.

While the embodiments of the present invention, as herein disclosed, constitute a preferred form, it is to be understood that other forms might be adopted.

What is claimed is:

1. A combination gas and liquid suspension device comprising, an outer cylinder having a closed end and an open end, an inner cylinder located within said outer cylinder in spaced relationship therewith to form an oil reservoir spaced therebetween, damping means within said inner cylinder including a rod member extending from said inner cylinder and beyond the open end of said outer cylinder, means for forming a gas space in the oil reservoir between said inner and outer cylinders including a closure member closing the open end of said outer cylinder and a bladder member having a closed U-bend end and an inner wall and an outer wall joined thereto, said closure member having axial spaced seal surfaces thereon, each of said seal surfaces located radially inwardly of said outer cylinder, means for sealing said inner wall of said bladder to one of said seal surfaces, means for sealing the outer wall to the other of said seal surfaces to form a sealed space between said closure member and said bladder member, passageway means in said closure member having an outlet formed in said closure member between said seal surfaces thereon, said passageway means adapted to be connected to a gas source for charging the space within said bladder to a predetermined pressure, means for filling the reservoir space with oil around said bladder and to fill said inner cylinder with oil, said bladder pressurizing said oil filled reservoir and the oil in said inner cylinder to produce a resultant force on said rod to cause it to extend from said inner and outer cylinders to produce a load leveling effect when the rod and outer cylinder are connected between the sprung and unsprung mass of a vehicle.

2. A combination gas and liquid suspension device adapted to be connected between the sprung and unsprung mass of a vehicle for maintaining a predetermined height relationship therebetween, an outer cylinder having means thereon adapted to be connected to one of the masses, an inner cylinder located within said outer cylinder forming therewith a liquid reservoir space, damping means including a piston rod within said inner cylinder, said piston rod extending from said inner cylinder outwardly of said outer cylinder and including means thereon adapted to be connected to the other of the masses of the vehicle, said outer cylinder having an open end and a closed end, a rod guide member located within the open end of said outer cylinder including a pair of axially spaced seal surfaces thereon, each of said seal surfaces located radially inwardly of the inner surface of said outer cylinder, a bladder member mounted in said liquid reservoir having a U-bend end portion with spaced apart circumferentially formed inner and outer walls thereon, one of said outer walls being located on one of said seal surfaces, the other of said walls being located on the other of said seal surfaces, means for sealingly securing each of said walls to said seal surfaces for connecting the bladder to the closure member for forming a flexible gas space within the outer cylinder supported solely on said rod guide member, means forming a passageway through said guide member having an outlet opening between said seal surfaces, said passageway means serving to provide a path for directing gas under pressure into the interior of the bladder for maintaining a predetermined pressure therein, means for filling the inner cylinder and the reservoir space with liquid to cause the gas space within the bladder to expand and contract, said gas space pressure being directed against liquid filling the reservoir space and the inner cylinder to produce a resultant force on the piston rod to cause it to move outwardly of the inner cylinder and outer cylinder to maintain a predetermined height relationship between the sprung and unsprung mass connected to the piston rod and to the outer cylinder.

3. A combination gas and liquid suspension device for maintaining a predetermined height between the sprung and unsprung mass of a vehicle comprising an outer cylinder having a closed end, mounting means on said closed end adapted to be connected to a mass portion of a vehicle, said outer cylinder having an open end, a liquid filled inner cylinder located within the outer cylinder having the outer surface thereof formed in spaced relationship to the inner surface of the outer cylinder to define a liquid reservoir space therebetween, damping means within said inner cylinder including a piston and a piston rod extending outwardly of said outer cylinder, a closure member for the open end of said outer cylinder including a rod guide surface thereon guiding the outer surface of said piston rod upon reciprocation thereof into and out of said inner cylinder, said closure member having a seal chamber therein, a seal member located within said seal chamber located in sealing engagement with the outer periphery of said piston rod for sealing said rod against leakage of liquid from within the inner cylinder outwardly thereof, a rod guide member located within said closure member supporting said rod at a point in axially spaced relationship with respect to said first mentioned rod guide surface, said closure member having an axial extension thereon extending inwardly of said outer cylinder, said extension having a first seal surface thereon located radially inwardly of the inner surface of said outer member and a second seal surface thereon located both axially and radially inwardly of said first seal surface thereon, a bladder member located within said reservoir space including a closed U-bend thereon joined to spaced-apart inner and outer wall portions, said outer wall portion having a circumferentially formed distal end thereon in engagement with said first seal surface, said inner wall portion having a circumferentially formed distal end portion thereon in engagement with said second seal surface, means for supporting each of said distal end portions in sealing engagement with their respective seal surfaces to form a sealed gas space within said bladder member, said inner and outer wall portions of said bladder depending from said closure seal surfaces in free floating relationship within said reservoir space, means forming a passageway through said closure member having an outlet formed on said closure member at a point between said first and second seal surfaces whereby gas under pressure can be charged into the sealed gas space, means for directing liquid into said reservoir space and to fill the inner cylinder with oil thereby to increase the gas pressure within said sealed gas space, means for communicating the reservoir space and the inner cylinder whereby changes in pressure within the gas space will act on the liquid within the liquid filled reservoir and the liquid filled inner cylinder to produce a resultant force on the piston rod to cause it to move from the inner and outer cylinders to control the height relationship between the sprung and unsprung mass of the vehicle.

4. A combination gas and liquid suspension device for maintaining a predetermined height between the sprung and unsprung mass of a vehicle comprising an outer cylinder having a closed end, mounting means on said closed end adapted to be connected to a mass portion of a vehicle, said outer cylinder having an open end, a liquid filled inner cylinder located within the outer cylinder having the outer surface thereof formed in spaced relationship to the inner surface of the outer cylinder to define a liquid filled reservoir space therebetween, damping means within said inner cylinder including a piston and a piston rod extending outwardly of said outer cylinder, a closure member for the open end of said outer cylinder, said closure member having an axial extension thereon extending inwardly of said outer cylinder, said extension having a first seal surface thereon located radially inwardly of the inner surface of said outer member and a second seal surface thereon located both axially and radially inwardly of said first seal surface thereon, a bladder member located within said reservoir space including a U-bend thereon joined to spaced-apart inner and outer wall portions, said outer wall portion having a circumferentially formed distal end thereon in engagement with said first seal surface, said inner wall portion having a circumferentially formed distal end portion thereon in engagement with said second seal surface, means for supporting each of said distal end portions in sealing engagement with their respective seal surfaces to form a sealed gas space within said bladder member, said inner and outer wall portions of said bladder depending from said closure seal surfaces in free floating relationship within said reservoir space, means forming a passageway through said closure member having an outlet formed on said closure member at a point between said first and second seal surfaces whereby gas under pressure can be charged into the sealed gas space for moving said inner and outer walls apart from another, a curved surface on the end of said extension for supporting said inner wall portion through a transition angle between the point at which it is connected to said closure and the outer surface of said inner cylinder, said outer wall being movable between an expanded position in engagement with the inner surface of said outer cylinder and a floating suspended relationship within said liquid reservoir in accordance with the amount of liquid within said liquid reservoir to allow for cooling of gas within said bladder by liquid surrounding said bladder, means for directing liquid into said reservoir space and to fill the inner cylinder thereby to cause said inner and outer walls of said bladder to move toward one another and increase the gas pressure within said sealed gas space, and means for communicating the reservoir space and the inner cylinder whereby changes in pressure within the gas space will act on the liquid within the liquid filled reservoir and the liquid filled inner cylinder to produce a resultant force on the piston rod to cause it to move from the inner and outer cylinders to control the height relationship between the sprung and unsprung mass of the vehicle.

* * * * *